(12) United States Patent
Ito et al.

(10) Patent No.: US 8,746,982 B2
(45) Date of Patent: Jun. 10, 2014

(54) ROLLING BEARING DEVICE

(75) Inventors: Daichi Ito, Kuwana (JP); Tomoya Nakamura, Kuwana (JP); Yasuhito Fujikake, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/583,092

(22) PCT Filed: Mar. 2, 2011

(86) PCT No.: PCT/JP2011/054695
§ 371 (c)(1),
(2), (4) Date: Sep. 6, 2012

(87) PCT Pub. No.: WO2011/122210
PCT Pub. Date: Oct. 6, 2011

(65) Prior Publication Data
US 2012/0328225 A1    Dec. 27, 2012

(30) Foreign Application Priority Data

Mar. 30, 2010 (JP) ................................. 2010-078969
Oct. 7, 2010 (JP) ................................. 2010-227652

(51) Int. Cl.
*F16C 33/66*    (2006.01)
*F16C 19/54*    (2006.01)
*F16C 19/08*    (2006.01)

(52) U.S. Cl.
CPC ......... *F16C 33/6611* (2013.01); *F16C 33/6648* (2013.01); *F16C 33/6677* (2013.01)
USPC ........... 384/463; 384/469; 384/474; 384/504; 384/563

(58) Field of Classification Search
CPC ............. F16C 2206/80; F16C 33/6696; F16C 33/303; F16C 33/6677; F16C 19/543
USPC ......... 384/462–463, 469, 474–475, 504, 548, 384/563
See application file for complete search history.

(56) References Cited

U.S. PATENT DOCUMENTS 4,472,004 A * 9/1984 Fingerle et al. ................ 384/463
5,320,433 A * 6/1994 Kimata et al. ................. 384/473
(Continued)

FOREIGN PATENT DOCUMENTS

DE    42 36 035    10/1993
EP    0 654 613    5/1995
(Continued)

OTHER PUBLICATIONS

International Search Report issued May 24, 2011 in International (PCT) Application No. PCT/JP2011/054695.
(Continued)

*Primary Examiner* — Marcus Charles
(74) *Attorney, Agent, or Firm* — Wenderoth, Lind & Ponack, L.L.P.

(57) ABSTRACT

A rolling bearing device includes inner races, outer races, rolling elements, a retainer, and an inner race spacer. The inner race spacer is formed of an oil reservoir member made of a sintered metal impregnated with lubricating oil, and a spacer cover fitted onto an outer periphery of the oil reservoir member. Through a centrifugal force to be applied to the oil reservoir member at the time of bearing rotation, the lubricating oil is scattered radially outward through a chamfered portion of the oil reservoir member via an oil supply passage, to thereby lubricate the interior of the bearing with oil.

17 Claims, 6 Drawing Sheets

(56) References Cited

U.S. PATENT DOCUMENTS

| | | | |
|---|---|---|---|
| 5,529,401 A | 6/1996 | Gabelli et al. | |
| 6,290,397 B1 * | 9/2001 | Hashimoto | 384/462 |
| 6,733,181 B2 * | 5/2004 | Koiwa et al. | 384/465 |
| 6,854,892 B2 * | 2/2005 | Lauck et al. | 384/462 |
| 7,036,989 B2 * | 5/2006 | Taki et al. | 384/475 |
| 7,918,606 B2 * | 4/2011 | Akamatsu et al. | 384/462 |
| 2009/0285512 A1 * | 11/2009 | Gebert | 384/44 |

FOREIGN PATENT DOCUMENTS

| | | | | |
|---|---|---|---|---|
| JP | 64-58815 | 3/1989 | | |
| JP | 5-22850 | 3/1993 | | |
| JP | 6-35653 | 5/1994 | | |
| JP | 6-73450 | 10/1994 | | |
| JP | 08-004773 | 1/1996 | | |
| JP | 10-103347 | 4/1998 | | |
| JP | 10-184705 | 7/1998 | | |
| JP | 2010078000 A * | 4/2010 | | F16C 33/66 |

OTHER PUBLICATIONS

International Preliminary Report on Patentability and Written Opinion of the International Searching Authority issued Nov. 22, 2012 in International (PCT) Application No. PCT/JP2011/054695.

Extended European Search Report dated Nov. 7, 2013 in corresponding European Application No. 11762450.2.

* cited by examiner

ROLLING BEARING DEVICE

CROSS REFERENCE TO RELATED APPLICATIONS

The present application is a U.S. national stage application of International (PCT) application No. PCT/JP2011/054695, filed Mar. 2, 2011, which claims priority to Japanese application No. 2010-078969, filed Mar. 30, 2010, and Japanese application No. 2010-227652, filed Oct. 7, 2010.

TECHNICAL FIELD

The present invention relates to a rolling bearing device to be used in an environment in which a general fluid lubricant (for example, grease) cannot be employed, and more particularly, to a rolling bearing device comprising an inner race spacer.

BACKGROUND ART

As a bearing device to be used for a liquid fuel turbopump of a rocket engine in a low-temperature, high-speed rotation environment and a rolling bearing device to be used for a space apparatus in a vacuum environment, a double row angular contact ball bearing is used in some cases. In this bearing device, angular contact ball bearings are arranged in two rows on an outer peripheral surface of a main shaft serving as a rotation shaft, and in many cases, an inner race spacer and an outer race spacer are mounted between the double row angular contact ball bearings to perform axial positioning of inner races and outer races.

In the above-mentioned rolling bearing device to be used in a low-temperature, high-speed rotation environment or in a vacuum environment, due to a problem of grease evaporation or the like, grease lubrication cannot be employed. On the other hand, there is an increasing demand of the market for improvement in reliability (safety factor) of this type of bearing device as a product through increase in life of the bearing device. Therefore, it is necessary to increase an absolute amount of a lubricant that contributes to the lubrication at the time of bearing rotation. In view of this, in a case of the rolling bearing device in which the grease lubrication cannot be employed, the absolute amount of the lubricant is increased through the following oil lubrication or solid lubrication.

In the former case of oil lubrication, the rolling bearing device includes, for example, an oil sump portion for storing lubricating oil in the inner race spacer. At the time of bearing rotation, the lubricating oil stored in the oil sump portion is scattered to the inner race side by a centrifugal force, and is supplied to an interior of the bearing between the inner race and the outer race (see Patent Literature 1). In the latter case of solid lubrication, the rolling bearing device includes, for example, columnar rolling element spacers each made of a material having self-lubricity and arranged between adjacent rolling elements among a plurality of rolling elements arrayed between the inner race and the outer race. At the time of bearing rotation, lubricating powder is scattered by friction from surfaces of the rolling element spacers that are held in contact with the rolling elements, and is supplied to the interior of the bearing (see Patent Literature 2).

CITATION LIST

Patent Literature 1: JP 10-184705 A
Patent Literature 2: JP 08-4773 A

SUMMARY OF INVENTION

Technical Problem

In the above-mentioned rolling bearing device that employs the oil lubrication, the inner race spacer is formed of two members, that is, a cylindrical inner spacer and a cylindrical outer spacer, and an oil sump chamber for storing lubricating oil is formed between the two members. The lubricating oil sealed into the oil sump chamber is scattered from a spacer end surface side, which is held in contact with the inner race, to the inner race side by the centrifugal force generated at the time of bearing rotation, and is caused to flow to the interior of the bearing. With this oil lubrication structure, the absolute amount of the lubricant that contributes to the lubrication at the time of bearing rotation is increased by the lubricating oil sealed into the oil sump chamber that is formed in the inner race spacer, with the result that the life of the rolling bearing device is increased and the safety is improved. Note that, in order to increase the absolute amount of the lubricating oil without changing an outer diameter dimension of the bearing, it is necessary to thin one or both of the two members forming the inner race spacer so as to enlarge the oil sump chamber. However, when the inner race spacer is thinned, strength thereof may become insufficient, and precise machining of the two members becomes extremely difficult, resulting in a problem of cost increase. Thus, it is difficult to further increase the absolute amount of the lubricant.

In the above-mentioned rolling bearing device that employs the solid lubrication, the absolute amount of the lubricant that contributes to the lubrication at the time of bearing rotation can easily be increased by increasing the number of rolling element spacers having self-lubricity, which are arranged in the bearing together with the rolling elements. However, the structure in which the rolling element spacers functioning only as a supply source of a solid lubricant are additionally arranged in the bearing is not preferred because of increase in number of components of the bearing.

It is an object of the present invention to provide a rolling bearing device capable of increasing an absolute amount of a lubricant that contributes to lubrication at the time of bearing rotation without increasing the number of components.

Solution to Problem

In order to achieve the above-mentioned object, according to the present invention, there is provided a rolling bearing device, comprising: an outer race on a stationary side; an inner race on a rotational side; a plurality of rolling elements interposed between a raceway surface of the inner race and a raceway surface of the outer race; a retainer for retaining the plurality of rolling elements; and an inner race spacer held in contact with an end surface of the inner race to perform axial positioning of the inner race, wherein the inner race spacer comprises an oil reservoir member formed of a porous body made of a metal or a resin, the oil reservoir member having pores containing lubricating oil, and wherein, at the time of rotation of the rolling bearing device, the oil reservoir member supplies the lubricating oil to an interior of the rolling bearing device by a centrifugal force.

The oil reservoir member formed of the porous body made of a metal or a resin has a large number of minute pores communicating to one another. Through impregnation of the oil reservoir member with the lubricating oil, the lubricating oil is contained in the large number of pores of the oil reservoir member. The lubricating oil impregnated into the oil reservoir member is scattered radially outward by the centrifugal force applied to the oil reservoir member that rotates together with a shaft at the time of bearing rotation, and is supplied to the interior of the bearing, to thereby perform the oil lubrication.

As described above, according to the present invention, the spacer, which is a component essential to the function of the bearing, is utilized as the supply source of the lubricating oil, and hence the number of components does not increase extremely. Further, the oil reservoir member is the porous body containing a large amount of lubricating oil inside, and the demand for increase in amount of the lubricating oil can easily be satisfied by thickening the oil reservoir member. Unlike the conventional case, the member forming the spacer does not need to be thinned to satisfy the demand, and therefore the strength and machinability become satisfactory. The oil reservoir member formed of the porous body can be manufactured by molding, and hence, even when the oil reservoir member is thinned, the oil reservoir member can be manufactured accurately at low cost.

In the rolling bearing device, it is desired that the oil reservoir member comprise an oil supply port provided in a surface thereof, the oil supply port having a surface opening ratio larger than a part of the oil reservoir member other than the oil supply port, and that the inner race spacer have an opening portion at an outer peripheral surface thereof so that the oil supply port is opened via an oil supply passage, and a part of the outer peripheral surface of the inner race spacer other than the opening portion be sealed. Accordingly, a large amount of lubricating oil contained in the oil reservoir member is not supplied at a time to the interior of the bearing through the entire outer peripheral surface of the inner race spacer, and only a small amount of lubricating oil successively seeping through the oil supply port of the oil reservoir member contributes to the lubrication of the interior of the bearing device via the oil supply passage. Therefore, the lubricating oil can be supplied stably for a long period of time.

It is desired that the inner race spacer further comprise a spacer cover having a contact portion held in contact with the end surface of the inner race, and covering an outer peripheral surface of the oil reservoir member, and that the oil supply passage have an opening at an inner peripheral surface of the spacer cover and another opening at an outer peripheral surface of the spacer cover, and the opening of the oil supply passage on a radially inner side thereof be opposed to the oil supply port of the oil reservoir member. Accordingly, the lubricating oil can stably be supplied from the oil reservoir member to the interior of the bearing device while maintaining the original function of the inner race spacer, that is, axial positioning of the inner race.

The spacer cover has the contact portion provided in a part of a circumferential region of an end surface thereof, the contact portion being held in contact with the end surface of the inner race, and has a non-contact portion provided in another part of the circumferential region, the non-contact portion being held out of contact with the end surface of the inner race. Further, the oil supply passage is formed in the non-contact portion. Accordingly, the oil supply passage can be formed at low cost.

The rolling bearing device may comprise a first oil sump provided adjacent to the oil reservoir member in the inner race spacer, the first oil sump containing the lubricating oil and being sealed on a radially outer side thereof by the spacer cover. Accordingly, even when the lubricating oil in the oil reservoir member is consumed, the oil reservoir member is successively replenished with the lubricating oil supplied from the first oil sump, with the result that the lubricating oil can be supplied from the oil reservoir member for a long period of time and the life of the bearing is increased. The first oil sump may be formed, for example, between the inner peripheral surface of the spacer cover and the outer peripheral surface of the oil reservoir member (see FIGS. 5 to 8). Further, in a case where a sleeve member is arranged on an inner periphery of the oil reservoir member, the sleeve member being fitted onto an outer peripheral surface of a shaft, the first oil sump may be formed between an outer peripheral surface of the sleeve member and the inner peripheral surface of the spacer cover (FIG. 9).

When a coefficient of linear expansion of the spacer cover is set equal to a coefficient of linear expansion of the oil reservoir member, a gap that may result in an oil sump is not formed between the inner peripheral surface of the spacer cover and the outer peripheral surface of the oil reservoir member even in a low-temperature atmosphere or a high-temperature atmosphere. Therefore, it is possible to prevent such a situation that the lubricating oil is excessively supplied at a time to the oil supply passage. For example, when the oil reservoir member and the spacer cover are made of the same material such as an iron-based or stainless-steel-based sintered metal, the coefficients of linear expansion of the oil reservoir member and the spacer cover become equal to each other in the usage temperature range, and hence the above-mentioned formation of the gap can be prevented more reliably.

In the above description, the inner race spacer is formed of the oil reservoir member and the spacer cover, but the inner race spacer may alternatively be formed (only) of the oil reservoir member (see FIG. 4). In this case, the outer peripheral surface of the oil reservoir member other than the oil supply port is sealed, and accordingly it is possible to prevent excessive supply of oil through the entire outer peripheral surface, while supplying only an appropriate amount of lubricating oil seeping through the oil supply port to the interior of the bearing device. The outer peripheral surface can be sealed by machining such as grinding.

A chamfered portion is provided at a radially outer end of the oil reservoir member, and the chamfered portion is used as the oil supply port. Accordingly, the lubricating oil seeping through the chamfered portion can reliably be supplied to the interior of the bearing device via the oil supply passage. When an area of the chamfered portion is extremely small, the amount of lubricating oil seeping through the chamfered portion becomes smaller, leading to insufficient lubrication. Therefore, it is preferred that the chamfered portion have a dimension of C0.5 or more.

It is desired that the oil reservoir member be molded, and the oil supply port be formed as a molded surface. When the surface of the oil reservoir member is machined, openings formed therein are filled, and hence the seepage of the lubricating oil is suppressed. On the other hand, a large number of openings are formed in the molded surface that is not machined. Therefore, the lubricating oil seeps actively from the interior of the oil reservoir member, and can reliably be supplied to the interior of the bearing device.

When the inner race and the oil reservoir member are fitted onto an outer peripheral surface of a shaft, a second oil sump may be provided between the outer peripheral surface of the shaft and an inner peripheral surface of the oil reservoir member, the second oil sump containing the lubricating oil (see FIG. 7). Accordingly, the total amount of oil contained in the bearing device is increased, and hence the life of the bearing can further be increased.

The inner race and the oil reservoir member may be fitted onto an outer peripheral surface of a shaft having a hollow portion so as to cause the hollow portion of the shaft to serve as a third oil sump containing the lubricating oil. Further, the shaft may have a through hole, which is opened on a radially inner side thereof at the third oil sump and is opened on a radially outer side thereof at the outer peripheral surface of the shaft that is opposed to the inner peripheral surface of the oil reservoir member (see FIG. 8). In this case, an oil sump that is even larger in volume can be ensured, and hence the life of the bearing can further be increased.

It is desired that the oil reservoir member be set to have a porosity of 10% to 30%. When the porosity is less than 10%, an amount of impregnated oil becomes insufficient, and when the porosity is more than 30%, strength of the material becomes insufficient.

In the present invention, it is desired that a solid lubricating film made of PTFE or the like for reducing starting friction be formed on at least one of the raceway surface of the inner race, the raceway surface of the outer race, and a surface of each of the plurality of rolling elements. For a similar reason, it is desired that a solid lubricating film made of PTFE or the like be formed on a surface of the retainer. When the plurality of rolling elements are made of ceramics, the centrifugal force to be applied to the rolling elements at the time of bearing rotation is reduced so that contact pressure of the outer race can be reduced.

The present invention is applicable to a rolling bearing device to be used for a liquid fuel turbopump of a rocket engine or for a space apparatus in a vacuum environment.

Advantageous Effects of Invention

According to the rolling bearing device of the present invention, the absolute amount of the lubricating oil that contributes to the lubrication can be increased without increasing the number of components of the bearing and thinning the inner race spacer. Thus, the life of the bearing can be increased. At this time, the strength of the spacer does not become insufficient and the spacer can be manufactured easily.

DESCRIPTION OF EMBODIMENTS

Figure 1:
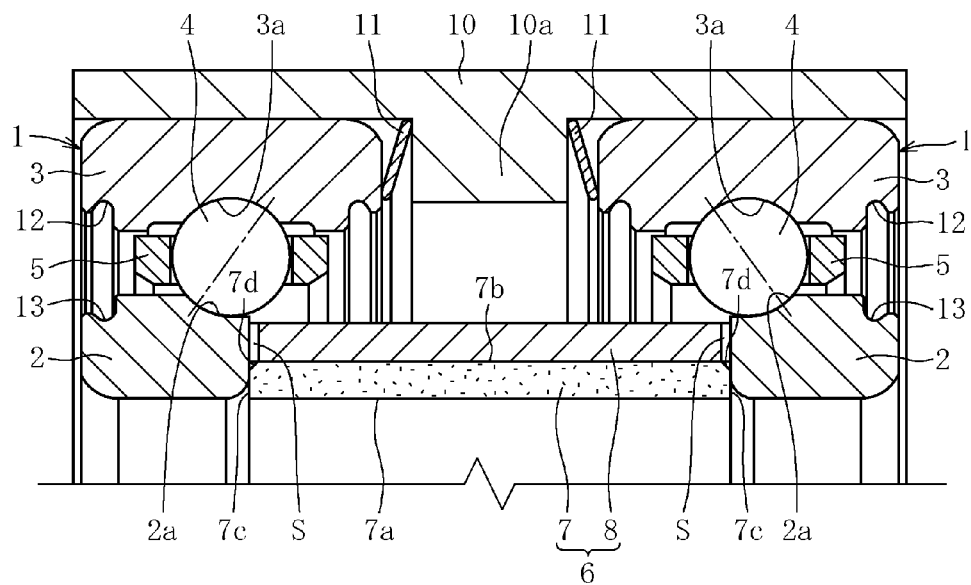
FIG. 1 A sectional view of a rolling bearing device according to an embodiment of the present invention.
Figure 10:
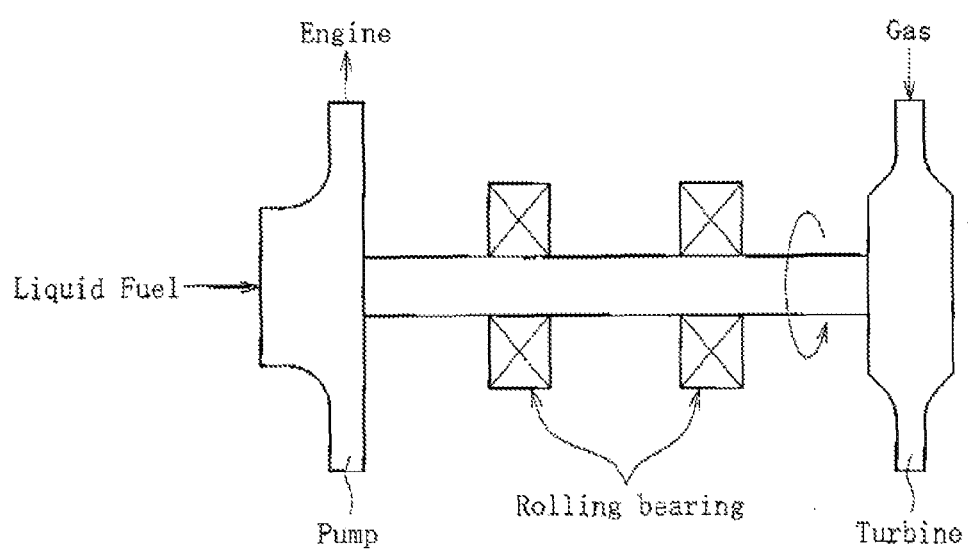
FIG. 10 A schematic view illustrating a configuration of a liquid fuel turbopump of a rocket engine including a rolling bearing device according to the present invention.

A rolling bearing device illustrated in FIG. 1 is applicable as a bearing for a liquid fuel turbopump of a rocket engine (for example, as illustrated in FIG. 10), which is to be used in a low-temperature, high-speed rotation environment, and the rolling bearing device comprises double row angular contact ball bearings 1. The angular contact ball bearings 1 comprise a pair of inner races 2 fixed by fitting to a shaft on a rotational side (20: see FIGS. 7 and 8), and a pair of outer races 3 fixed by fitting to an inner peripheral surface of an outer race spacer 10. In each angular contact ball bearing 1, a plurality of rolling elements 4 are arranged at a contact angle between a raceway surface 2a of the inner race 2 and a raceway surface 3a of the outer race 3, and a retainer 5 retains the rolling elements 4 at regular intervals in a circumferential direction thereof.

An inner race spacer 6 is installed between the pair of inner races 2. The inner race spacer 6 has a cylindrical shape, and both end surfaces thereof are held in contact with inner end surfaces of the double row inner races 2 and 2, respectively, to thereby perform positioning of the inner races 2 in an axial direction thereof. At the time of bearing rotation, the inner races 2 and the inner race spacer 6 mounted by fitting to the shaft rotate integrally with the shaft. Each inner race 2 has a form obtained by cutting out its shoulder portion on an inner bearing side, which does not come into angular contact with the rolling elements 4. Therefore, in the bearing device, surfaces of the rolling elements 4 are opposed to an outer peripheral surface of the inner race spacer 6.

A protruding portion 10a protruding in a radially inner direction of the outer race spacer 10 is provided at a center portion of the outer race spacer 10, and elastic members for imparting a bearing preload, such as belleville springs 11, are arranged between both end surfaces of the protruding portion 10a and end surfaces of both the outer races 3. On both sides of the bearing device in the axial direction thereof, seal members (not shown) prevent lubricating oil from being scattered outside the bearing. The seal members each have its radially outer end mounted by fitting to a mounting groove 12, which is formed in an inner peripheral surface of a shoulder portion of the outer race 1. A non-contact seal is formed between a lip provided at a radially inner end of the seal member and a seal groove 13 formed in an outer peripheral surface of the shoulder portion of the inner race 2. Note that, the seal member may be omitted.

Due to a problem of grease evaporation or the like, a fluid lubricant such as grease cannot be sealed into an internal space of the bearing device. In order to reduce starting friction that becomes problematic due to the absence of the fluid lubricant, a solid lubricating film made of PTFE or the like is formed on at least one or all of the raceway surface 2a of the inner race, the raceway surface 3a of the outer race, and the surface of the rolling element 4. For a similar purpose, a solid lubricating film made of PTFE or the like is formed on the entire surface of the retainer 5 including internal surfaces of pockets.

The inner race 2, the outer race 3, and the rolling element 4 may be made of stainless steel such as martensitic stainless steel. Note that, the rolling element 4 may be made of ceramics. In the case of the rolling element 4 made of ceramics, a centrifugal force to be applied to the rolling element at the time of bearing rotation is reduced so that contact pressure of the outer race can be reduced. Accordingly, the life of the bearing can be increased. The retainer 5 is made of a resin such as a composite material obtained by adding glass fibers or carbon fibers to PEEK or the like. Besides, the retainer 5 may be made of a metal material such as cemented steel, aluminum alloy, stainless steel, and copper alloy.

In the embodiment illustrated in FIG. 1, the inner race spacer 6 is formed of two members, that is, a cylindrical oil reservoir member 7 and a cylindrical spacer cover 8 fitted onto an outer peripheral surface 7b of the oil reservoir member 7. The oil reservoir member 7 is formed of a porous body made of a metal or a resin, and has a large number of minute pores communicating to one another. Through impregnation of the oil reservoir member 7 with lubricating oil, the lubricating oil is retained in the respective pores.

Figure 3:
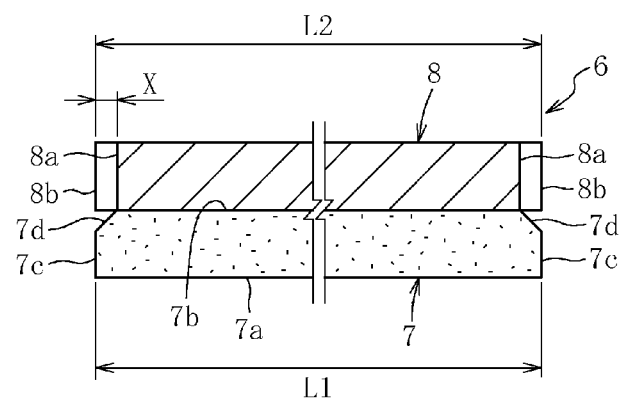
FIG. 3 An enlarged sectional view of the inner race spacer illustrated in FIG. 1.

The oil reservoir member 7 is made of, for example, a sintered metal. The sintered metal is obtained by subjecting metal powder to molding using a molding die (powder molding), followed by sintering at a predetermined temperature. Molding conditions such as a pressing force are set so that the sintered metal after the sintering has a porosity of 10% or more and 30% or less, desirably about 20%. The above-mentioned numerical range is set because, when the porosity is less than 10%, an amount of the contained lubricating oil becomes insufficient, and when the porosity is more than 30%, strength becomes insufficient. As illustrated in FIG. 3, chamfered portions 7d are molded at radially outer ends of both end surfaces of the compact, respectively, at the stage of powder molding for the oil reservoir member 7. Each chamfered portion 7d after the sintering has a taper angle of about 45 degrees and a dimension of C0.5 or more. As the sintered metal, iron-based, copper-based, iron/copper-based, stainless steel-based, and tungsten-based sintered metals are publicly known. Any of those sintered metals may be used, but it is preferred that an iron-based or stainless-steel-based sintered metal be used so as to minimize a coefficient of linear expansion of the oil reservoir member 7.

An inner peripheral surface 7a, the outer peripheral surface 7b, and both end surfaces 7c of the sintered metal after the sintering are machined by turning or the like as a subsequent process, and are finished into specified dimensions, with the result that the oil reservoir member 7 is obtained. At this time, the chamfered portions 7d are not machined, and the surfaces molded using a molding die at the time of powder molding (molded surfaces) are left with no change. Through the machining, openings in the inner peripheral surface 7a, the outer peripheral surface 7b, and both the end surfaces 7c of the oil reservoir member 7 are filled so that their surface opening ratios decrease to less than 10%. On the other hand, in each chamfered portion 7d, the porosity (10% to 30%) of the sintered metal after the sintering is maintained, and hence a surface opening ratio of the chamfered portion 7d is larger than the surface opening ratios of the other surfaces of the oil reservoir member 7, such as the inner peripheral surface 7a, the outer peripheral surface 7b, and both the end surfaces 7c. As long as the surface opening ratio of the chamfered portion 7d is larger than the surface opening ratios of the other surfaces of the oil reservoir member 7, the chamfered portion 7d may be machined by turning or the like to adjust its surface opening ratio.

The oil reservoir member 7 after the machining is impregnated with lubricating oil. As the lubricating oil, there is used a synthetic oil having satisfactory lubricity even at low temperature (−50° C. or less), such as a fluorine-based oil. The oil reservoir member 7 may be impregnated with the lubricating oil under a state in which the oil reservoir member 7 is mounted to an inner periphery of the spacer cover 8, or alternatively the oil reservoir member 7 may solely be impregnated with the lubricating oil before the oil reservoir member 7 is mounted to the inner periphery of the spacer cover 8.

Figure 2:
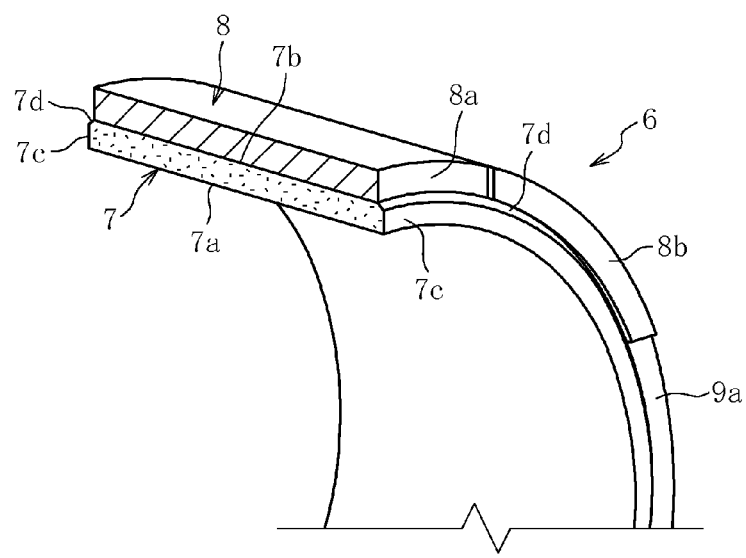
FIG. 2 A partial perspective view of an inner race spacer illustrated in FIG. 1.

As illustrated in FIGS. 2 and 3, the spacer cover 8 is made of a solid (poreless) resin or metal material into a cylindrical shape. The spacer cover 8 has an axial length L2 having a relationship of L1≤L2 with an axial length L1 of the oil reservoir member 7. The spacer cover 8 is partially cut out in circumferential regions thereof so that depressions 8a are formed in both end surfaces of the spacer cover 8. The depressions 8a are formed intermittently at a plurality of locations in the circumferential direction, and hence a plurality of the depressions 8a and projections 8b between adjacent depressions 8a are formed alternately in both the end surfaces of the spacer cover 8. The projections 8b formed in both the end surfaces all serve as contact portions to be brought into contact with the end surfaces of the inner races 2, respectively. It is desired that a step X between the depression 8a and the projection 8b (see FIG. 3) have the same or smaller dimension as compared to the dimension C of the chamfered portion.

The inner race spacer 6 formed of the oil reservoir member 7 and the spacer cover 8 is interposed between the pair of inner races 2, and both the end surfaces 7c of the oil reservoir member 7 and end surfaces of the projections 8b formed in both the end surfaces of the spacer cover 8 are brought into contact with the end surfaces of the inner races 2, respectively. Accordingly, both the inner races 2 are positioned in the axial direction. Further, at non-contact portions between the inner races 2 and the spacer cover 8, that is, at positions between inner surfaces of the depressions 8a and the end surfaces of the inner races 2, there are formed oil supply passages S, which are opened at an inner peripheral surface and an outer peripheral surface of the spacer cover 8 and are opposed at their radially inner openings to the chamfered portions 7d of the oil reservoir member 7 in the radial direction, respectively.

In the above-mentioned structure, when the oil reservoir member 7 rotates along with rotation of the shaft, the lubricating oil impregnated into the oil reservoir member 7 seeps through the surfaces of the chamfered portions 7d, and is scattered radially outward via the oil supply passages S. The scattered lubricating oil reaches the surfaces of the rolling elements 4 that are opposed to the oil supply passages S in the radial direction, and is further transferred to the raceway surfaces 2a of the inner races and the raceway surfaces 3a of the outer races, to thereby lubricate the interior of the bearing. As described above, the surface opening ratio of each chamfered portion 7d of the oil reservoir member 7 is larger than the surface opening ratios of the other surfaces of the oil reservoir member 7, and hence the lubricating oil seeps smoothly through the chamfered portion 7. Therefore, the chamfered portion 7d functions as an oil supply port of the oil reservoir member 7.

According to the present invention, the inner race spacer 6, which is a component essential to the function of the bearing, is utilized as the supply source of the lubricating oil, and hence the number of components does not increase extremely. Further, the oil reservoir member 7 is the porous body containing a large amount of lubricating oil inside, and the demand for increase in amount of the lubricating oil can easily be satisfied by thickening the oil reservoir member 7. Unlike the conventional case, the spacer does not need to be thinned to satisfy the demand. Therefore, the life of the bearing can be increased while avoiding the decrease in strength of the inner race spacer 6 and increase in process cost. The oil reservoir member is thickened, and hence the strength and machinability become more satisfactory.

In particular, when the outer peripheral surface 7b of the oil reservoir member 7 is, as in this embodiment, covered with the spacer cover 8 so as to seal the outer peripheral surface of the inner race spacer 6, a large amount of lubricating oil is not supplied at a time to the interior of the bearing device through the entire outer peripheral surface 7b of the oil reservoir member 7, and only a small amount of lubricating oil successively seeping through the chamfered portions 7d can contribute to the lubrication. Thus, an appropriate amount of lubricating oil can be supplied stably for a long period of time, and the life of the bearing can further be increased. Further, when the surface opening ratio of each chamfered portion $7d$ and the dimension C of the chamfered portion are adjusted, the amount of the lubricating oil to be supplied to the interior of the bearing and its supply period can be changed freely, with the result that an optimum lubrication state suited to the usage of the bearing device can be obtained easily. The inner race spacer 6 is formed of two members, and hence the oil reservoir member 7 may be thinned in some cases, but even in such cases, the oil reservoir member 7 can be manufactured by molding, and hence the oil reservoir member 7 can be obtained accurately at low cost.

By the way, the rolling bearing device of this embodiment is used in a low-temperature atmosphere and a high-temperature atmosphere, that is, in a temperature range from −50° C. or less to 150° C. In the case where the rolling bearing device is used in such a wide ambient temperature range, when a difference between the coefficient of linear expansion of the oil reservoir member 7 and the coefficient of linear expansion of the spacer cover 8 is large, a gap is generated between the outer peripheral surface $7b$ of the oil reservoir member 7 and the inner peripheral surface of the spacer cover 8. Such a gap results in an oil sump, which is not preferred because a large amount of lubricating oil is supplied at a time through the oil supply passages S. Thus, in the case where the rolling bearing device is used in the above-mentioned wide ambient temperature range, in order to prevent the formation of this type of gap over the entire temperature range, it is desired that the oil reservoir member 7 be made of a material having a coefficient of linear expansion equal to the coefficient of linear expansion of the spacer cover 8 (for example, the same material as that of the spacer cover 8). Thus, in the case where the oil reservoir member 7 is, as described above, made of a sintered metal such as an iron-based, stainless-steel-based, or other sintered metal, the spacer cover 8 can be made of the same kind of sintered metal. Accordingly, the coefficient of linear expansion of the spacer cover 8 can be reduced as well as that of the oil reservoir member 7, and hence the above-mentioned formation of the gap can be prevented more reliably. In this case, in order to prevent oil leakage through the outer peripheral surface of the spacer cover 8, it is preferred that the entire outer peripheral surface of the spacer cover 8 be subjected a sealing process.

Figure 4:
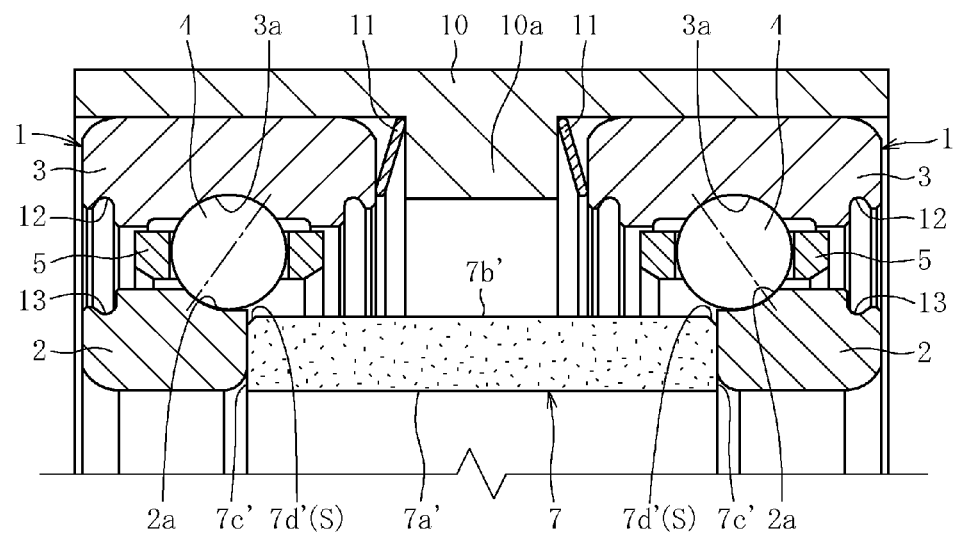
FIG. 4 A sectional view illustrating another embodiment of the present invention.

In the above description, there has been exemplified a case where the inner race spacer 6 is formed of two members, that is, the oil reservoir member 7 and the spacer cover 8. Alternatively, the inner race spacer 6 may be formed only of the oil reservoir member 7. FIG. 4 illustrates an example thereof, in which the inner race spacer 6 is formed only of the oil reservoir member 7 made of a sintered metal containing oil. Also in this case, an inner peripheral surface $7a'$, an outer peripheral surface $7b'$, and both end surfaces $7c'$ of the oil reservoir member 7 are machined, whereas chamfered portions $7d'$ are not machined and left as the molded surfaces. In particular, the outer peripheral surface $7b'$ other than the chamfered portions $7d'$ is carefully machined to seal the openings formed therein (reduce the surface opening ratio close to 0%). Accordingly, the outer peripheral surface of the inner race spacer 6 is sealed, and hence oil scattering through the outer peripheral surface $7b'$ of the oil reservoir member 7 is reduced. In this structure, each chamfered portion $7d'$ serves as the oil supply port, and the gap between the chamfered portion $7d'$ and the end surface of each inner race 2 serves as the oil supply passage S. The lubricating oil is supplied to the interior of the bearing device through the oil supply passage S. In order to attain the state in which the outer peripheral surface of the inner race spacer 6 is sealed, the outer peripheral surface $7b'$ of the oil reservoir member 7 other than the chamfered portions $7d'$ may be coated with a resin film.

In the embodiment illustrated in FIG. 4, the inner race spacer 6 is formed only of the oil reservoir member 7, and hence the number of components is further reduced. Further, the oil reservoir member 7 has a size corresponding to a combined size of the oil reservoir member 7 and the spacer cover 8 illustrated in FIG. 1, and hence the amount of lubricating oil contained in the oil reservoir member 7 can be increased by an amount corresponding to the volume of the spacer cover 8, with the result that the useful life of the bearing device can further be increased. Further, the gap is not generated between the oil reservoir member 7 and the spacer cover 8 due to the difference in coefficient of linear expansion, which leads to a wider range of selection of the material for the oil reservoir member 7.

In the above description, there has been exemplified a case where the oil reservoir member 7 is made of a sintered metal. Alternatively, the oil reservoir member 7 may be made of a publicly known porous resin. As a resin material for this kind of porous resin, there may be used, for example, a polyolefin resin, a polyamide resin, a polyacetal resin, a fluorocarbon resin, a polyether ether ketone resin, a polyethylene terephthalate resin, a polyethylene terephthalate resin, and a biodegradable resin. The oil reservoir member 7 can be obtained by subjecting the porous resin to molding (if necessary, machining the outer peripheral surface, the inner peripheral surface, and both the end surfaces), followed by the impregnation with lubricating oil. Also in this case, the chamfered portions $7d$ or $7d'$ are not machined and used as the molded surfaces to serve as the oil supply ports each having a surface opening ratio larger than the other portions of the oil reservoir member 7. As a result, a necessary amount of lubricating oil can be supplied smoothly to the interior of the bearing.

In this case, in order to avoid the effect of the above-mentioned linear expansion, in the structure illustrated in FIG. 1, the spacer cover 8 may be formed of a porous body made of the same kind of resin as that of the oil reservoir member 7, and the entire outer peripheral surface of the spacer cover 8 may be subjected to an appropriate sealing process so that the outer peripheral surface of the inner race spacer 6 can be sealed.

Figure 5:
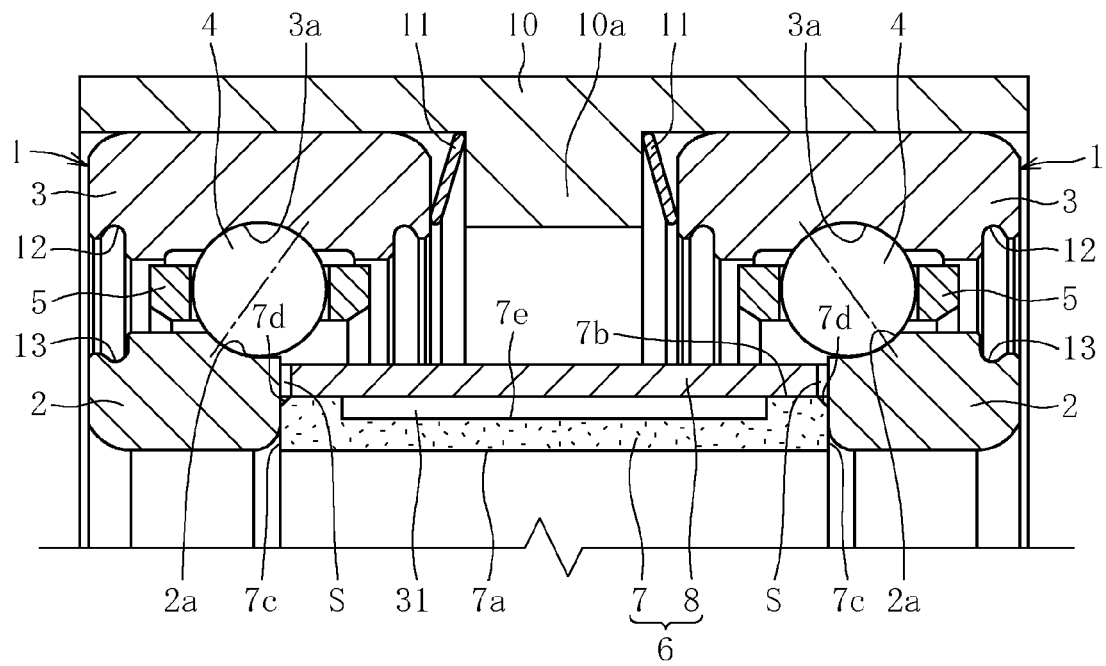
FIG. 5 A sectional view illustrating still another embodiment of the present invention.
Figure 6:
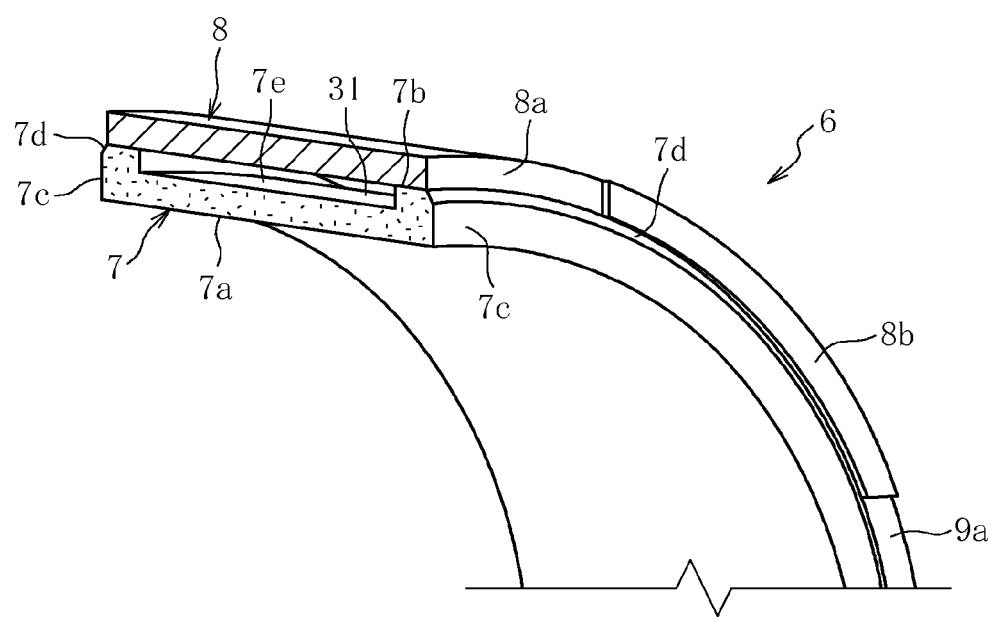
FIG. 6 A partial perspective view of an inner race spacer illustrated in FIG. 5.

FIGS. 5 and 6 illustrate still another embodiment of the present invention. In this embodiment, a first oil sump 23 sealed on its radially outer side by the spacer cover 8 is provided adjacent to the oil reservoir member 7. FIGS. 5 and 6 exemplify a case where an annular groove $7e$ is formed in the outer peripheral surface $7b$ of the oil reservoir member 7 so as to form the annular first oil sump 31 between the outer peripheral surface of the oil reservoir member 7 and the inner peripheral surface of the spacer cover 8. The lubricating oil is stored in the first oil sump 31 at a stage of assembling the bearing device (for example, after the spacer cover 8 is fitted onto the outer periphery of the oil reservoir member 7). Instead of forming the first oil sump 31 into an annular shape, the first oil sump 31 may be provided at one or more locations in the circumferential direction. Each of bottom and side surfaces of the groove $7e$ needs to have a large surface opening ratio so that the lubricating oil is smoothly absorbed into the oil reservoir member 7. Therefore, it is desired that those surfaces be left as the molded surfaces. It is understood that those surfaces may be machined by turning or the like as long as the lubricating oil can securely be absorbed into the oil reservoir member 7. However, grinding is not preferred because the surface opening ratio becomes extremely smaller. The basic structure of the rolling bearing device illustrated in FIGS. 5 and 6 is common to that of the embodiment illustrated in FIG. 1 except the shape of the oil reservoir member 7. Therefore, common members are represented by the same reference symbols, and redundant description thereof is therefore omitted herein.

Also in the embodiment illustrated in FIG. 5, the chamfered portions 7d provided at both the ends of the oil reservoir member 7 are the molded surfaces, and function as the oil supply ports. Therefore, the lubricating oil seeping through the chamfered portions 7d is supplied to the internal space of the bearing device via the oil supply passages S by the centrifugal force. The oil reservoir member 7 is successively replenished with the lubricating oil contained in the first oil sump 31, with the result that the total amount of oil contained in the inner race spacer 6 can be increased, and the life of the bearing can be increased.

Figure 7:
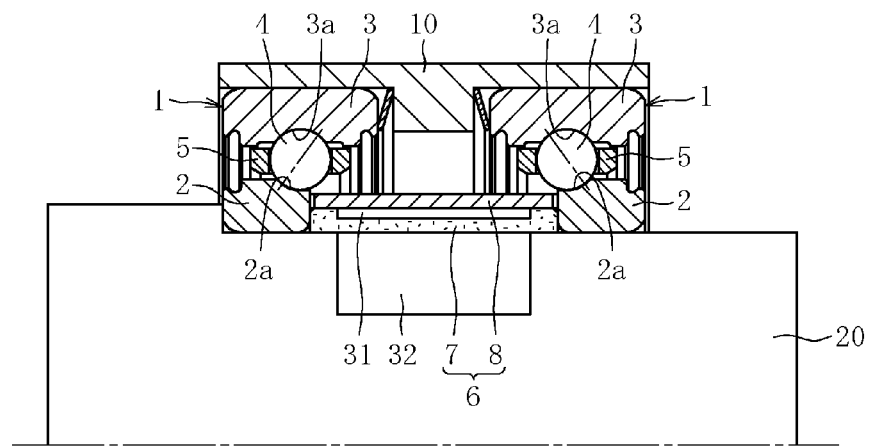
FIG. 7 A sectional view illustrating the rolling bearing device mounted to a shaft.

FIG. 7 illustrates a state in which the rolling bearing device illustrated in FIG. 5 is mounted to the shaft 20. In FIG. 7, a second oil sump 32 is provided in an outer peripheral surface of the shaft 20 that is opposed to the inner peripheral surface of the oil reservoir member 7. The second oil sump 32 may be formed into an annular shape, or may alternatively be provided at one or more locations in the circumferential direction. The lubricating oil is stored in the second oil sump 32 in advance, and accordingly the oil reservoir member 7 is replenished with the lubricating oil supplied from the first oil sump 31 and also from the second oil sump. Thus, the life of the bearing can further be increased.

Figure 8:
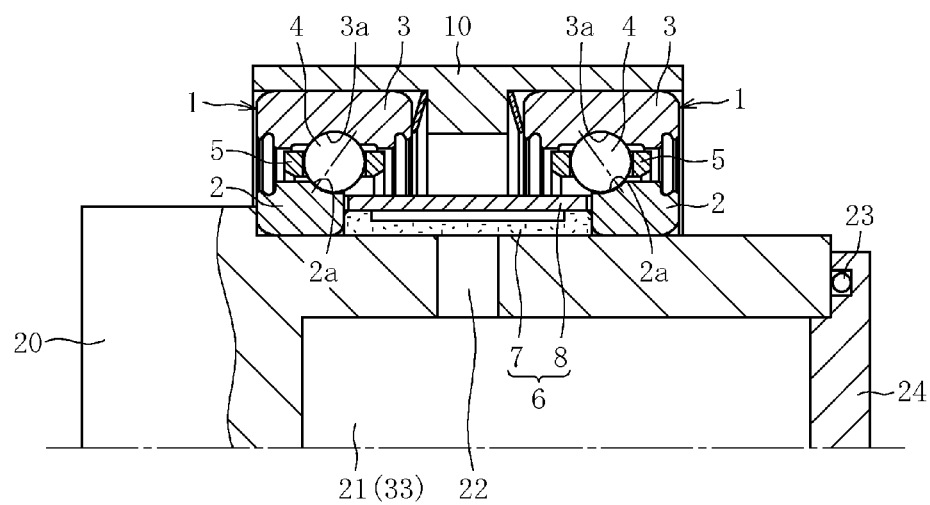
FIG. 8 A sectional view illustrating the rolling bearing device mounted to the shaft.

FIG. 8 illustrates a state in which the rolling bearing device illustrated in FIG. 5 is mounted to the shaft 20, as in FIG. 7. In this embodiment, the shaft 20 is provided with a hollow portion 21, which is opened at one end of the shaft 20, and is further provided with a through hole 22 in the radial direction, which is opened on its radially inner side at the hollow portion 21. The through hole 22 is opened on its radially outer side at the outer peripheral surface of the shaft 20 that is opposed to the inner peripheral surface of the oil reservoir member 7. The lubricating oil is stored in the hollow portion 21 at the stage of assembling the bearing device, and the opening portion of the hollow portion 21 is sealed with a lid member 24 via a seal 23 such as an O-ring. The through hole 22 may be provided at one or more locations in the circumferential direction.

In this structure, the hollow portion 21 serves as a third oil sump 33, and the oil reservoir member 7 is replenished with the lubricating oil supplied from the third oil sump 33 via the through hole 22. Thus, the life of the bearing can further be increased.

Note that, FIGS. 7 and 8 exemplify a case where the bearing device illustrated in FIG. 5 is mounted to the shaft 20, but the structures illustrated in FIGS. 7 and 8 are similarly applicable to the bearing devices illustrated in FIGS. 1 and 4.

Figure 9:
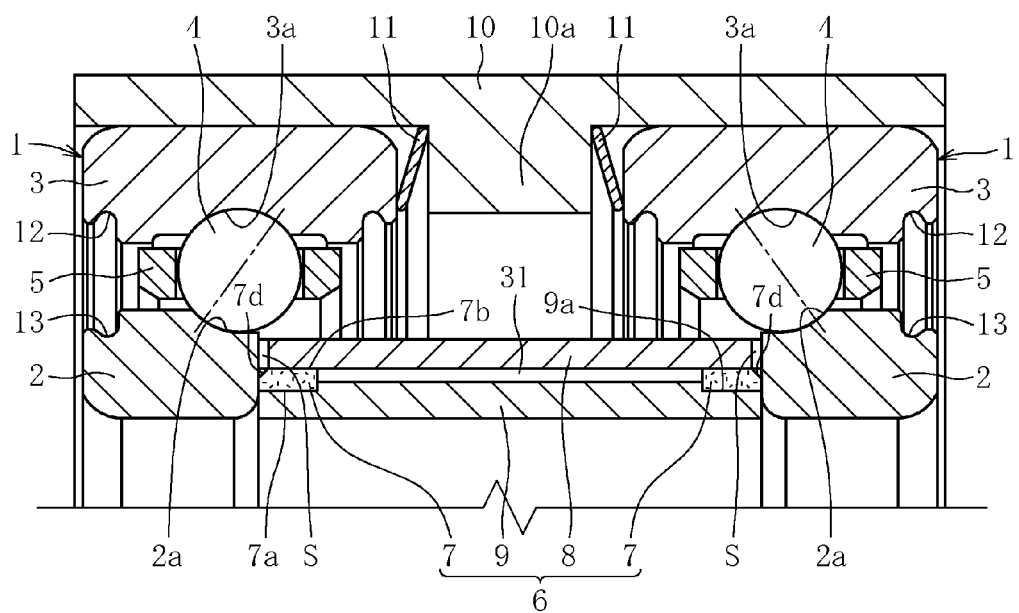
FIG. 9 A sectional view illustrating yet another embodiment of the present invention.

FIG. 9 illustrates yet another embodiment of the present invention. In this embodiment, the inner race spacer 6 is formed of the oil reservoir members 7, the spacer cover 8, and a sleeve member 9, which is fixed by fitting to the outer periphery of the shaft and has small diameter portions 9a at both axial ends of an outer peripheral surface of the sleeve member 9. The oil reservoir members 7 are fitted onto the small diameter portions 9a of the sleeve member 9, respectively, and the spacer cover 8 is fitted onto the outer peripheral surfaces 7b of the oil reservoir members 7. Each of the outer peripheral surfaces 7b of the oil reservoir members 7 is larger in diameter than the outer peripheral surface of the sleeve member 9, and hence a gap is formed between the inner peripheral surface of the spacer cover 8 and the outer peripheral surface of the sleeve member 9. The lubricating oil is stored in the gap at the stage of assembling the bearing device, and hence the first oil sump 31 is formed similarly to the embodiment illustrated in FIG. 5.

The oil reservoir members 7 comprise the chamfered portions 7d at the respective radially outer end portions. Similarly to the embodiments described above, the chamfered portions 7d are the molded surfaces each having a large surface opening ratio, and function as the oil supply ports. Therefore, the lubricating oil seeps smoothly through the chamfered portions 7d, and at the time of bearing operation, the lubricating oil seeping through the chamfered portions 7d is supplied to the interior of the bearing device via the oil supply passages S. Further, the first oil sump 31 is arranged adjacent to the oil reservoir members 7, and the oil reservoir members 7 are successively replenished with the lubricating oil retained in the first oil sump 31. Therefore, the total amount of oil contained in the inner race spacer 6 can be increased, and the life of the bearing is increased.

In the embodiment illustrated in FIG. 9, the sleeve member 9 may be made of a solid (poreless) resin or metal material, or may alternatively be made of a porous resin or metal material.

The rolling bearing device described above can be used widely as a bearing device for a liquid fuel turbopump of a rocket engine, and also as a bearing device to be used under a usage condition in which grease cannot be used, such as a bearing device that rotates at high speed and at low temperature and a bearing device to be used in a vacuum such as a space environment. Further, the angular contact ball bearing is exemplified as one type of bearing, but the present invention is also applicable to a rolling bearing device using another type of bearing (for example, deep groove ball bearing).

REFERENCE SIGNS LIST 1 bearing
2 inner race
2a raceway surface of inner race
3 outer race
3a raceway surface of outer race
4 rolling element
5 retainer
6 inner race spacer
7 oil reservoir member
7d chamfered portion (oil supply port)
8 spacer cover
9 sleeve member
20 shaft
31 first oil sump
32 second oil sump
33 third oil sump
S oil supply passage

The invention claimed is:
1. A rolling bearing device, comprising:
an outer race on a stationary side;
an inner race on a rotational side;
a plurality of rolling elements interposed between a raceway surface of the inner race and a raceway surface of the outer race;
a retainer for retaining the plurality of rolling elements; and
an inner race spacer held in contact with an end surface of the inner race to perform axial positioning of the inner race,
wherein the inner race spacer comprises an oil reservoir member having inner and outer peripheral surfaces, and a spacer cover fitted on the outer peripheral surface of the oil reservoir member, wherein the oil reservoir member is formed of a porous body made of a metal or a resin and has an oil supply port provided on a surface of the oil reservoir member with a surface opening ratio larger than the outer peripheral surface of the oil reservoir member, the oil supply port being opened on an outer peripheral surface of the inner race spacer via an oil supply passage, the oil reservoir member having pores containing lubricating oil, and wherein, at the time of rotation of the rolling bearing device, the oil reservoir member supplies the lubricating oil to an interior of the rolling bearing device by a centrifugal force.

2. A rolling bearing device according to claim 1, wherein the spacer cover has a contact portion held in contact with the end surface of the inner race, and covers the outer peripheral surface of the oil reservoir member, and wherein the oil supply passage has an opening at an inner peripheral surface of the spacer cover and another opening at an outer peripheral surface of the spacer cover, and the opening of the oil supply passage on a radially inner side thereof is opposed to the oil supply port of the oil reservoir member.

3. A rolling bearing device according to claim 2, wherein the spacer cover has the contact portion provided in a part of a circumferential region of an end surface thereof, the contact portion being held in contact with the end surface of the inner race, and has a non-contact portion provided in another part of the circumferential region, the non-contact portion being held out of contact with the end surface of the inner race, and wherein the oil supply passage is formed in the non-contact portion.

4. A rolling bearing device according to claim 2, further comprising a first oil sump provided adjacent to the oil reservoir member in the inner race spacer, the first oil sump containing the lubricating oil and being sealed on a radially outer side thereof by the spacer cover.

5. A rolling bearing device according to claim 4, wherein the first oil sump is formed between the inner peripheral surface of the spacer cover and the outer peripheral surface of the oil reservoir member.

6. A rolling bearing device according to claim 4, further comprising a sleeve member arranged on an inner periphery of the oil reservoir member, the sleeve member being fitted onto an outer peripheral surface of a shaft, wherein the first oil sump is formed between an outer peripheral surface of the sleeve member and the inner peripheral surface of the spacer cover.

7. A rolling bearing device according to claim 2, wherein a coefficient of linear expansion of the spacer cover is set equal to a coefficient of linear expansion of the oil reservoir member.

8. A rolling bearing device according to claim 1, wherein the oil reservoir member includes a chamfered portion provided at a radially outer end of the oil reservoir member, the chamfered portion being the oil supply port.

9. A rolling bearing device according to claim 8, wherein the chamfered portion has a dimension of C0.5 or more.

10. A rolling bearing device according to claim 1, wherein the oil reservoir member is a molded body, and the oil supply port is a molded surface.

11. A rolling bearing device according to claim 1, wherein the inner race and the oil reservoir member are fitted onto an outer peripheral surface of a shaft so as to provide an oil sump between the outer peripheral surface of the shaft and the inner peripheral surface of the oil reservoir member, the oil sump containing the lubricating oil.

12. A rolling bearing device according to claim 1, wherein the inner race and the oil reservoir member are fitted onto an outer peripheral surface of a shaft having a hollow portion so as to cause the hollow portion of the shaft to serve as an oil sump containing the lubricating oil, and wherein the shaft has a through hole, which is opened on a radially inner side thereof at the oil sump and is opened on a radially outer side thereof at the outer peripheral surface of the shaft that is opposed to the inner peripheral surface of the oil reservoir member.

13. A rolling bearing device according to claim 1, wherein the oil reservoir member has a porosity of 10% to 30%.

14. A rolling bearing device according to claim 1, further comprising a solid lubricating film formed on at least one of the raceway surface of the inner race, the raceway surface of the outer race, and a surface of each of the plurality of rolling elements.

15. A rolling bearing device according to claim 1, further comprising a solid lubricating film formed on a surface of the retainer.

16. A rolling bearing device according to claim 14, wherein the plurality of rolling elements are made of ceramics.

17. An apparatus comprising a liquid fuel turbopump of a rocket engine or a space apparatus to be used in a vacuum environment that includes a rolling bearing device according to claim 1.

* * * * *